Nov. 5, 1940.  E. H. WALKER  2,220,832
FOG LIGHT
Filed April 7, 1939  2 Sheets-Sheet 1
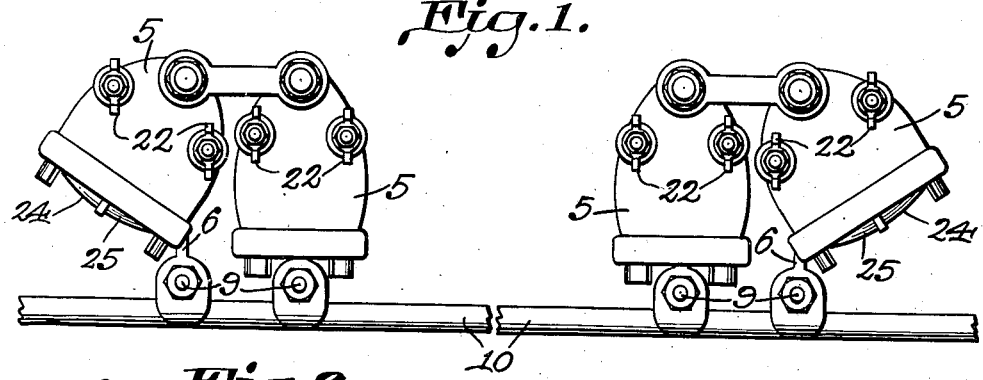
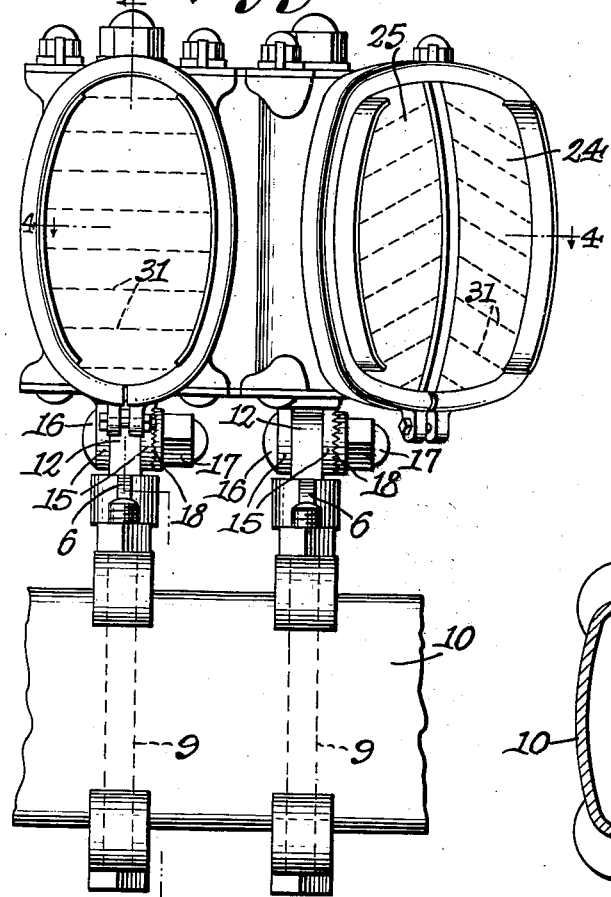
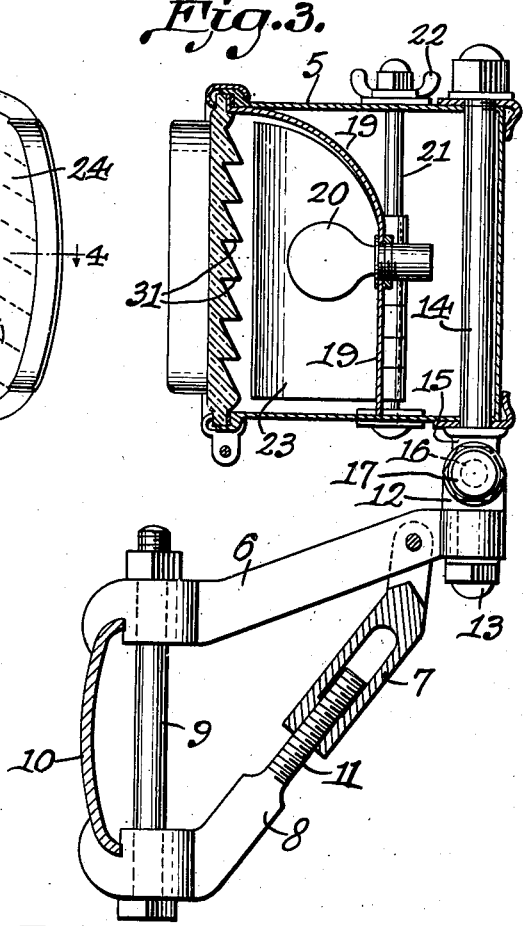
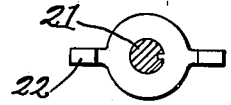
E. H. Walker INVENTOR.
BY C. Snow Co.
ATTORNEYS.

Nov. 5, 1940.  E. H. WALKER  2,220,832
FOG LIGHT
Filed April 7, 1939   2 Sheets-Sheet 2

E. H. Walker INVENTOR.

BY (signature)

ATTORNEYS.

Patented Nov. 5, 1940

2,220,832

UNITED STATES PATENT OFFICE 2,220,832

FOG LIGHT

Edward H. Walker, Somerset, Pa.

Application April 7, 1939, Serial No. 266,700

3 Claims. (Cl. 240—7.1)

This invention relates to motor vehicle headlights of the auxiliary type and commonly known as fog lights.

The primary object of the invention is to provide a fog light of a construction which will divert the direct white light rays from a headlight, into the colored light rays projected from an adjacent headlight, to infiltrate the fog and divert the reflex of the light caused by the light rays from headlights.

An important object of the invention is to provide a fog light having means for regulating the light rays from the lamp of the fog light to cause the light rays to be directed to the road area at the proper angle to illuminate the road surface and facilitate driving during a fog.

Another object of the invention is the provision of a pair of headlights embodying a clear lens and a colored lens arranged with respect to each other so that the clear light rays and colored light rays which meet at a predetermined point, will be directed laterally of the line of vision of the operator, whereby the driver of the motor vehicle, will have a much clearer vision of the road surface directly in front of the motor vehicle.

With the foregoing and other objects in view, which will appear as the description proceeds, the invention resides in the combination and arrangement of parts and in the details of construction hereinafter described and claimed, it being understood that changes in the precise embodiment of the invention herein described, may be made within the scope of what is claimed, without departing from the spirit of the invention.

Referring to the drawings:

Figure 1 is a plan view illustrating pairs of fog lights, constructed in accordance with the invention, as supported on the bumper of a motor vehicle.

Figure 2 is a front elevational view of one pair of fog lights.

Figure 3 is a sectional view taken on line 3—3 of Figure 2.

Figure 5 is a sectional view through the screen supporting and adjusting bolts of the headlights.

Figure 4:
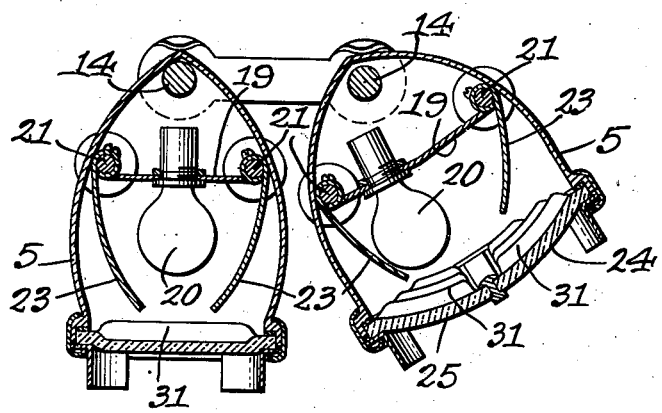
Figure 4 is a sectional view taken on line 4—4 of Figure 2.

In carrying out my invention in the preferred form, I provide a pair of headlights designed to be positioned at each end of the front bumper of a motor vehicle. Each headlight comprises a body portion indicated generally by the reference character 5, the body portions being of the construction of the conventional type of motor vehicle headlights.

The headlights are supported by adjustable brackets, shown more clearly by Figure 3 of the drawings, and each bracket includes an upper bar 6 and a lower bar embodying adustable sections 7 and 8, the upper bar and adjustable section 8 being formed with notches adjacent to their forward ends, so that they may be readily positioned over the usual front bumper of a motor vehicle. A bolt indicated at 9 extends through the upper bar 6 and adjustable section 8, securing the bracket to the bumper, which in the present showing is indicated by the reference character 10.

The adjustable section 8 is formed with a threaded portion 11 threaded in the hollow adjustable section 7, so that the length of the lower bar of the bracket, may be adjusted to permit the bracket to be positioned on bumpers of various widths.

The bar 6 is formed with an opening through which the bolt 12 extends, the bolt being secured in position by means of the nut 13 mounted on the lower end thereof.

The light supporting bolt, is indicated by the reference character 14 and extends through the rear of the body portion of the lamp, the lower end of the bolt 14 being provided with spaced ears 15 between which the head of the bolt 12 is positioned, the bolts 12 and 14 being adjustably held with respect to each other, by means of the bolt 16 which is shown as extending through the ears and head of the bolt 12, the bolt 16 being held in its positions of adjustment, by means of the cap nut 17. Cooperating teeth 18 are formed on one of the ears 15 and cap nut 17, for holding the bolt 16 in its positions of adjustment.

Mounted within each lamp body portion or housing, is a lamp supporting reflector 19, the lamp supporting reflector being formed with electric sockets, to accommodate the lamps indicated at 20.

The ends of the lamp supporting reflector plates 19 are bent around the bolts 21 that extend vertically through the lamp housings, the upper ends of the bolts being provided with finger pieces 22, whereby the bolts may be rotated, for purposes to be hereinafter more fully described.

The reference character 23 designates curved screens or light shields, which are of lengths to extend throughout the height of the lamp housing in which they are positioned, the inner ends of the curved screens being secured to the bolts 21, so that as the bolts are rotated, the screens will be correspondingly moved to adjust the screens with respect to the lamps.

As shown by Figure 4 of the drawings, the lamp housing or body portion constituting the outside lamp of the pair of lamps, is substantially larger than the adjacent lamp, and the lens closing the outer end of the housing is divided, providing a clear inner section and a colored outer section.

The outer lamp housing is disposed at an oblique angle with respect to the adjacent lamp housing, and the outer lens section 24 is of a conventional color used in fog lamp construction. The inner lens section is of clear glass as indicated by the reference character 25. It might be further stated that in the outer lamp housing, the lamp 20 is supported on the lamp supporting plate 19 at a point adjacent to the inner side wall of the lamp housing, so that the light rays projected from the lamp, will be directed, to a greater degree, to the clear section 25 of the lens.

The inner lamp of each pair of lights, is disposed substantially centrally of its supporting plate, and the screens 23 thereof, are adjusted so that a substantially small opening is provided through which the lights rays from the electric lamps supported within the housing, are projected.

Figure 6:
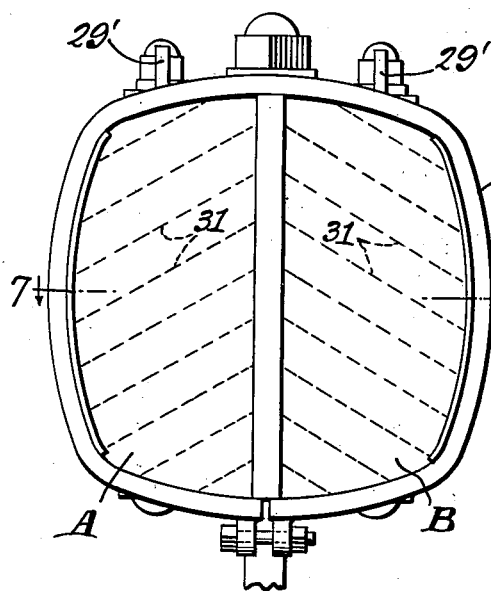
Figure 6 is an elevational view of a modified form of fog light.
Figure 7:
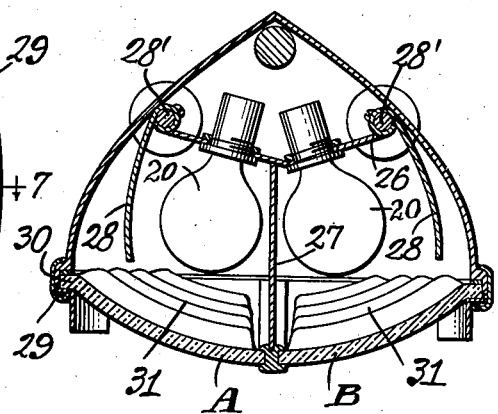
Figure 7 is a sectional view taken on line 7—7 of Figure 6.

In the modified form of the invention as illustrated by Figures 6 and 7 of the drawings, the principle of the invention is carried out with a single lamp housing wherein a pair of electric lamps are supported therein, the lens of the lamp housing being divided and providing a clear section A and a colored section B, as clearly shown.

In this form of the invention, the lamp supporting plate is indicated by the reference character 26 and the space between the plate 26 and lens, is divided by a vertical partitioning member 27, the surfaces thereof being constructed to provide reflecting surfaces. The front surface of the lamp supporting plate 26 is also constructed to provide a reflecting surface, so that light rays will be projected forwardly through the lens of the lamp housing. When this type of light is used, only one lamp housing is necessary to accomplish the purpose of the invention.

In order to confine the light rays to a location in direct line with the front of the headlight housing, curved screens 28 are employed, the curved screens being mounted on the rods 28' that extend vertically through the housing, the upper ends of the bolts being provided with finger pieces 29' whereby the positions of the screens 28 may be adjusted. The sectional lens is held in position by means of the usual lens ring 29 that engages the lateral flanges 30 of the lens sections.

It might be further stated that the lenses used in closing the front ends of the lamp housings, are provided with transverse ribs 31 to properly diffuse the light rays from the lamps.

From the foregoing it will be seen that due to the construction shown and described, the light rays from the headlights may be projected onto the road surface and at such an angle as to insure against the operator of the vehicle equipped with the lights being blinded when the light rays from the lights are projected into a fog area. Because of the construction of the adjustable screens, it will be obvious that the light rays may be controlled to insure the light rays being directed to the road area at the proper angle to illuminate the road surface and facilitate driving, during a fog.

What is claimed is:

1. An infiltrating fog light comprising a lamp housing, a vertical transversely disposed supporting plate within the housing dividing the housing into front and rear compartments, a vertical partition extending forwardly from the supporting plate dividing the front compartment into independent lamp compartments, lamps mounted on the supporting plate and disposed at opposite sides of the partition, lenses closing the fronts of the lamp compartments, one of said lenses being clear and the adjacent lens being colored, adjustable screens mounted within the lamp compartments, and said screens adapted to direct the light rays from one lamp through the light rays from the adjacent lamp.

2. An infiltrating fog light comprising a lamp housing, a vertical transversely disposed supporting plate within the housing, said supporting plate dividing the housing into front and rear compartments, a vertical partitioning member extending forwardly from the supporting plate and dividing the front compartment into independent lamp compartments, lamps mounted within the lamp compartments, lenses closing the outer ends of the compartments, one of said lenses being clear and the adjacent lens being colored, and adjustable screen members adjustable independently of each other, within the lamp compartments and adapted to direct the light rays from one lamp across the light rays of the adjacent lamp.

3. An infiltrating fog light comprising a lamp housing, a partition within the lamp housing and dividing the lamp housing into a pair of lateral lamp compartments, lamps supported within the compartments, lenses closing the outer ends of the compartments, one of said lenses being clear, the opposite lens being colored to direct light rays through the rays passing through the clear glass, screen members within the lamp compartments and curved to fit around the lamps within the compartments, and means for supporting the screens for adjustment independent of each other.

EDWARD H. WALKER.